(12) United States Patent
Xiao et al.

(10) Patent No.: US 10,906,006 B2
(45) Date of Patent: Feb. 2, 2021

(54) HOMOGENEOUS FIBER REINFORCED PVDF HOLLOW FIBER MEMBRANE AND PREPARATION METHOD THEREOF

(71) Applicant: TIANJIN POLYTECHNIC UNIVERSITY, Tianjin (CN)

(72) Inventors: Changfa Xiao, Tianjin (CN); Jingjing Yan, Tianjin (CN); Chun Wang, Tianjin (CN); Xiaoyu Hu, Tianjin (CN); Mingxing Chen, Tianjin (CN); Hailiang Liu, Tianjin (CN); Shulin An, Tianjin (CN)

(73) Assignee: TIANJIN POLYTECHNIC UNIVERSITY, Tianjin (CN)

( * ) Notice: Subject to any disclaimer, the term of this patent is extended or adjusted under 35 U.S.C. 154(b) by 301 days.

(21) Appl. No.: 15/989,202

(22) Filed: May 25, 2018

(65) Prior Publication Data
US 2018/0272289 A1 Sep. 27, 2018

(51) Int. Cl.
*B01D 69/08* (2006.01)
*B01D 71/34* (2006.01)
*B01D 69/10* (2006.01)
*B01D 69/14* (2006.01)
*B01D 69/04* (2006.01)
*B01D 67/00* (2006.01)

(52) U.S. Cl.
CPC ........... *B01D 69/088* (2013.01); *B01D 69/10* (2013.01); *B01D 69/148* (2013.01); *B01D 71/34* (2013.01); *B01D 67/0079* (2013.01); *B01D 69/04* (2013.01); *B01D 69/081* (2013.01)

(58) Field of Classification Search
CPC ...... B01D 69/00; B01D 71/34; B01D 68/081; B01D 67/0011; B01D 67/0016; B01D 69/10; B01D 67/0079; B01D 69/08
See application file for complete search history.

(56) References Cited

U.S. PATENT DOCUMENTS

| | | | | |
|---|---|---|---|---|
| 4,882,223 A | * | 11/1989 | Aptel | A23C 9/1422 428/398 |
| 5,340,480 A | * | 8/1994 | Kawata | B01D 67/0011 210/500.23 |
| 5,472,607 A | | 12/1995 | Mailvaganam et al. | |
| 5,914,039 A | * | 6/1999 | Mahendran | B01D 67/0011 210/490 |

(Continued)

FOREIGN PATENT DOCUMENTS

| CN | 1695777 | 11/2005 |
|---|---|---|
| CN | 1864828 | 11/2006 |

(Continued)

*Primary Examiner* — Ana M Fortuna

(57) ABSTRACT

A homogeneous fiber reinforced PVDF hollow fiber membrane and a preparation method thereof are provided. The membrane includes a hollow tubular reinforcement made of PVDF fibers and a polymer separation layer made of PVDF casting solution; wherein the polymer separation layer casting solution comprises 4-25% PVDF resin, 5-20% pore-forming agent, 0-3% inorganic particles and 52-91% solvent according to mass fraction. The preparation method includes steps of: (1) preparing a hollow tubular reinforcement made of PVDF fibers; (2) preparing a PVDF polymer separation layer casting solution; and (3) obtaining the homogeneous fiber reinforced PVDF hollow fiber membrane.

3 Claims, 1 Drawing Sheet

(56) References Cited

U.S. PATENT DOCUMENTS

| | | | |
|---|---|---|---|
| 7,165,682 B1* | 1/2007 | Ji | A23C 9/1422 210/490 |
| 7,413,804 B2 | 8/2008 | Lee et al. | |
| 9,095,819 B2* | 8/2015 | Xiao | B01D 67/002 |
| 2009/0206026 A1* | 8/2009 | Yoon | B01D 69/10 210/490 |
| 2013/0112614 A1* | 5/2013 | Seo | D06B 21/00 210/500.23 |
| 2015/0096934 A1* | 4/2015 | Xiao | B01D 69/02 210/500.23 |
| 2015/0136691 A1* | 5/2015 | Yang | B01D 69/088 210/500.23 |
| 2016/0001233 A1* | 1/2016 | Xiao | B01D 71/56 210/500.23 |
| 2016/0325237 A1* | 11/2016 | Okamura | B01D 69/12 |
| 2017/0232402 A1* | 8/2017 | Xiao | B01D 69/12 210/500.23 |

FOREIGN PATENT DOCUMENTS

| | | |
|---|---|---|
| CN | 101239281 | 8/2008 |
| CN | 101357303 | 2/2009 |
| CN | 102160967 A | 8/2011 |
| CN | 102266726 A | 12/2011 |
| CN | 102266728 A | 12/2011 |
| CN | 102600733 A | 7/2012 |
| CN | 102784566 A | 11/2012 |
| CN | 202638293 U | 1/2013 |
| CN | 103432916 A | 12/2013 |
| CN | 104801205 A | 7/2015 |
| CN | 104888621 A | 9/2015 |
| CN | 105597569 A | 5/2016 |
| CN | 106139912 A | 11/2016 |
| CN | 106731878 A | 5/2017 |
| CN | 106861462 A | 6/2017 |
| CN | 107008163 A | 8/2017 |
| CN | 107051216 A | 8/2017 |

* cited by examiner

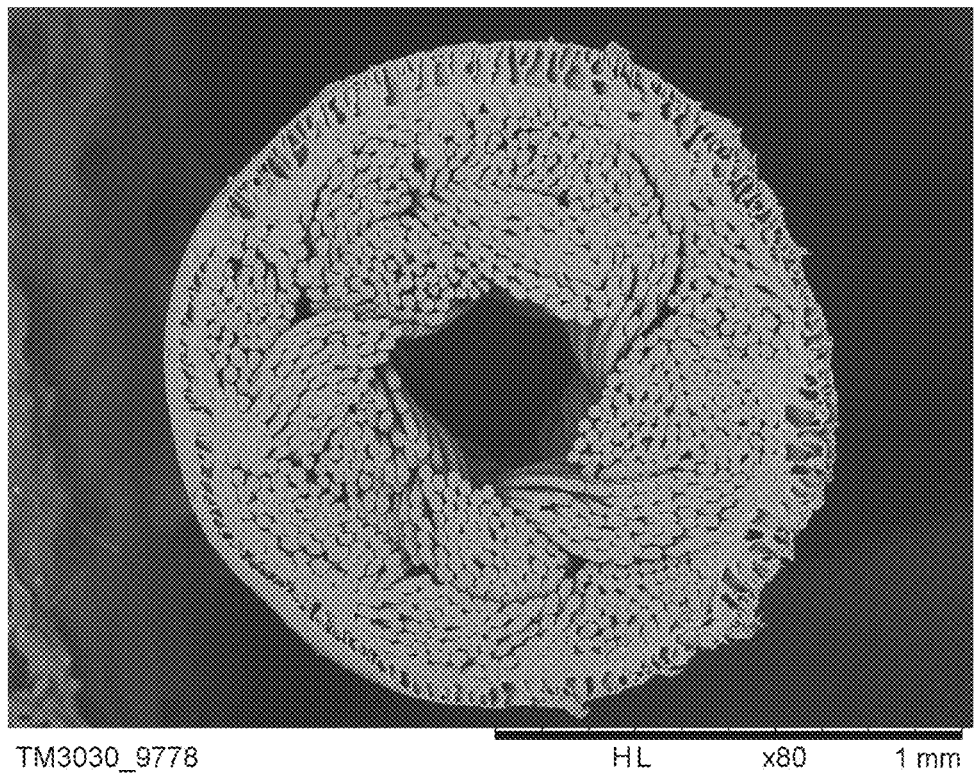

HOMOGENEOUS FIBER REINFORCED PVDF HOLLOW FIBER MEMBRANE AND PREPARATION METHOD THEREOF

CROSS REFERENCE OF RELATED APPLICATION

The present invention claims priority under 35 U.S.C. 119(a-d) to CN 201710948091.5, filed Dec. 4, 2017.

BACKGROUND OF THE PRESENT INVENTION

Field of Invention

The present invention relates to a membrane technical field, and more particularly to a homogeneous fiber reinforced PVDF hollow fiber membrane and a preparation method thereof.

Description of Related Arts

Chinese patent CN102600733A discloses a homogeneous reinforced polyvinylidene fluoride hollow fiber membrane preparation method, wherein a hollow fiber base membrane with excellent strength is prepared by the melt spinning method. The base membrane is a reinforced hollow fiber membrane, and then the base membrane surface is evenly coated with a polymer separation layer. The homogeneous reinforced polyvinylidene fluoride hollow fiber membrane is prepared by a melt spinning method, which is characterized by taking full advantage of the good thermodynamic compatibility of homogeneous materials, so as to provide excellent interface bonding strength. However, the membrane has bad resistance to bending, tensile, shake, etc., wherein mechanical properties need to be further improved, and flux is insufficient.

Conventionally, in the research of reinforced hollow fiber membrane, filament and braided tube reinforcement are mainly adopted. For example, Chinese patent CN1695777A (LI, Pengli et al.) extrudes chemical fiber filaments and casting solution together, so as to improve tensile strength of polyvinylidene fluoride hollow fiber membrane, after that, a reticular fiber reinforced polyvinylidene fluoride hollow fiber membrane preparation method is further developed (see Chinese patent CN1864828A), first, the synthetic fibers are woven into a reticulation outside the prepared hollow fiber membrane, and then the hollow fiber membrane wrapped with reticulation is immersed in the casting solution, for obtaining a reticular fiber reinforced polyvinylidene fluoride hollow fiber membrane. Referring to some patents U.S. Pat. Nos. 5,472,607, 7,267,872B2 et. al, fiber braided tube is also used to reinforce. The pore diameters obtained by the above methods are easy to control and the tensile strength is obviously improved. However, all of them are heterogeneous reinforced hollow fiber membranes which are composed of different materials for the polymer separation layer and the reinforcement, leading to a problem that the reliability of the membrane operation system is poor due to poor interface bonding. In actual application, the compression of the high-pressure water stream for a long time, the impact disturbance, and the frequent backwash will all cause great damage to the membrane, wherein adhesion between the separation layer and reinforcement is not strong enough, so the membrane will be broken, or the separation layer will be peeled from the reinforcement, resulting in a greater impact on the quality of produced water, severe restriction of the service life of membrane products and industrialization promotion. In addition, reinforcement of heterogeneous materials will be a burden in the subsequent recovery.

Therefore, people have taken a series of improvements: for example, in order to increase adhesion between the fiber braided tube and polymer casting solution, Chinese patent CN101357303A firstly applies a layer of fluoride silane coupling agent on the fiber braided tube, and then coats the fiber braided tube with the casting solution, so as to effectively increase the bonding strength between the polymer and the fiber braided tube. Chinese patent CN102784566A processes the reinforcement with pre-treatment, pre-coating and so on to obtain a pre-coated modified hollow braided tube, and then the surface of the braided tube is uniformly coated with the casting solution, so as to prepare a heterogeneous reinforced polyvinylidene fluoride hollow fiber membrane with high adhesion strength. However, the production processes of these methods are complicated, much cost and consume in the production process will increases, which are not beneficial to continuous large-scale production, and also bring inconvenience to the subsequent recycling.

Chinese patent CN104888621A discloses a method for processing a two-dimensional braided tube with a low concentration PVDF solution by heat treatment. The method firstly uses a low concentration polyvinylidene fluoride solution to soak the braided tube until the solution penetrates into the internal side of the tube, and then the external side is coated with a high-concentration casting solution, so as to obtain a braided tube homogeneous reinforced polyvinylidene fluoride hollow fiber membrane. Although this method improves the interface bonding strength of the membrane to a certain extent, the braided tube and the casting solution are still different materials, which not truly belongs to homogeneous fiber reinforced polyvinylidene fluoride hollow fiber membrane.

As far as we know, no reports have been made on the use of tubular knit fabric as a reinforcement of a homogeneous fiber reinforced polyvinylidene fluoride hollow fiber membrane. As the reinforcement, the knitted fabric provides thin wall and large unfilled coefficient, and has certain influence on the interface bonding strength and flux of the membrane. Using the tubular knitted fabric as the reinforcement of the homogeneous fiber reinforced polyvinylidene fluoride hollow fiber membrane not only provides excellent interface bonding, but also provides species diversity of the reinforcement of the homogeneous fiber reinforced polyvinylidene fluoride hollow fiber membrane.

SUMMARY OF THE PRESENT INVENTION

In view of the deficiencies of the conventional technologies, the present invention provides a homogeneous fiber reinforced PVDF hollow fiber membrane and a preparation method thereof. The membrane uses PVDF fiber braided tube or tubular knitted fabric as a reinforcement, wherein solidified PVDF casting solution forms a polymer separation layer at a membrane surface. The homogeneous fiber reinforced PVDF hollow fiber membrane prepared by the preparation method has excellent mechanical properties and interface bonding strength, wherein the polymer separation layer can be thin, supporting property is good, interlayer has no dense layer, filtration resistance is small, flux is large, and production process is simple, so the membrane is suitable for industrial production, and follow-up recycling is convenient, which is beneficial to recycling.

Accordingly, in order to accomplish the above object, the present invention provides a homogeneous fiber reinforced PVDF (polyvinylidene fluoride) hollow fiber membrane, comprising: a hollow tubular reinforcement made of PVDF fibers and a polymer separation layer made of PVDF casting solution; wherein the polymer separation layer casting solution comprises 4-25% PVDF resin, 5-20% pore-forming agent, 0-3% inorganic particles and 52-91% solvent according to mass fraction.

Accordingly, in order to accomplish the above object, the present invention also provides a method for preparing a homogeneous fiber reinforced PVDF hollow fiber membrane, comprising steps of:

(1) preparing the hollow tubular reinforcement made of PVDF fibers; wherein the hollow tubular reinforcement is a PVDF fiber braided tube or a PVDF fiber tubular knitted fabric; the PVDF fiber braided tube is a hollow braided tube with a diameter of 1-2 mm, which is made of PVDF fiber filaments with a 2-dimensional woven technology; and the PVDF fiber tubular knitted fabric is a single layer tubular knitted fabric with a diameter of 1-2 mm, which is made of the PVDF fiber filaments with a crochet machine;

(2) preparing the PVDF polymer separation layer casting solution, which specifically comprises steps of: according to mass fraction, mixing 4-25% PVDF resin, 5-20% pore-forming agent and 0-3% inorganic particles in 52-91% solvent at 60-90° C. for obtaining a polymer separation layer casting solution with a total fraction of 100%; then stirring for 3-5 h for dissolving, and vacuum-defoaming, so as to obtain a homogenized PVDF polymer separation layer casting solution; wherein the pore-forming agent is a water-soluble polymer which is polyethylene glycol having an average molecular weight of 600-20000, polyvinylpyrrolidone having an average molecular weight of 10000-100000, or a blend thereof with a designed mass ratio; the solvent is selected from at least one of N,N-dimethylacetamide, N,N-dimethylformamide, dimethylsulfoxide and N-methylpyrrolidone; the inorganic particles are selected from at least one of lithium chloride, silicon dioxide and aluminum oxide;

(3) obtaining the homogeneous fiber reinforced PVDF hollow fiber membrane, which specifically comprises steps of: evenly coating the PVDF polymer separation layer casting solution on a surface of the hollow tubular reinforcement through a spinning nozzle; the hollow tubular reinforcement passes through a 2-25 cm air bath under traction of a winding roller; then immersing in a coagulation bath at 0-50° C. for solidifying, so as to obtain the homogeneous fiber reinforced PVDF hollow fiber membrane.

Compared with the conventional technologies, the preparation method of the present invention uses the braided tube or the tubular knitted fabric for reinforcing, wherein the polymer separation layer material and the reinforcement hollow fiber tubular material are all PVDF, so as to solve a problem of the conventional technologies that bonding strength between hollow fiber membrane reinforcement and separation layer is insufficient, and to prepare a true homogeneous fiber reinforced PVDF hollow fiber membrane. The prepared homogeneous fiber reinforced PVDF hollow fiber membrane has good interface bonding between internal and external layers (polymer separation layer and reinforcement), which provides excellent mechanical properties (breaking strength>90 MPa) and large flux, and can be used for high-pressure backwash. Furthermore, the membrane of the present invention can provide braided tubes and tubular knitted fabrics with different structures as reinforcements. Meanwhile, the membrane prepared has good stain resistance, the simple preparation method is suitable for industrial production, and the convenient follow-up recycling is beneficial to recycling.

These and other objectives, features, and advantages of the present invention will become apparent from the following detailed description, the accompanying drawings, and the appended claims.

BRIEF DESCRIPTION OF THE DRAWINGS

FIGURE is an electron micrograph of a cross section of a homogeneous fiber reinforced PVDF hollow fiber membrane according to an embodiment 1 of the present invention.

DETAILED DESCRIPTION OF THE PREFERRED EMBODIMENT

Referring to embodiments, the present invention will be further illustrated.

The present invention provides a homogeneous fiber reinforced PVDF hollow fiber membrane (membrane or homogeneous reinforced membrane for short), comprising: a hollow tubular reinforcement (reinforcement for short) made of PVDF fibers and a polymer separation layer made of PVDF casting solution; wherein the polymer separation layer casting solution comprises 4-25% PVDF resin, 5-20% pore-forming agent, 0-3% inorganic particles and 52-91% solvent according to mass fraction.

Preferably, the hollow tubular reinforcement is a PVDF fiber braided tube (braided tube for short) or a PVDF fiber tubular knitted fabric (tubular knitted fabric for short). Methods for preparing the braided tube or the tubular knitted fabric are known to the technical persons in the field.

The present invention also provides a method for preparing a homogeneous fiber reinforced PVDF hollow fiber membrane (preparation method for short), comprising steps as follows.

Step (1): preparing the hollow tubular reinforcement made of PVDF fibers; wherein the hollow tubular reinforcement is a PVDF fiber braided tube or a PVDF fiber tubular knitted fabric; the PVDF fiber braided tube is a hollow braided tube with a diameter of 1-2 mm, which is made of PVDF fiber filaments with a 2-dimensional woven technology; and the PVDF fiber tubular knitted fabric is a single layer tubular knitted fabric with a diameter of 1-2 mm, which is made of the PVDF fiber filaments with a crochet machine; methods for preparing the braided tube or the tubular knitted fabric are known to the technical persons in the field.

According to the present invention, the braided tube or the tubular knitted fabric with different structures can be provided as the reinforcement by changing parameters such as spindle number and knitting pitch of the braided tube, or cylinder diameter and needle number of the tubular knitted fabric, so as to improve physical characteristics such as interface bonding strength and flux of the hollow fiber membrane. A structural shape of the braided tube or the tubular knitted fabric provides a structural shape of the reinforcement.

Step (2): preparing the PVDF polymer separation layer casting solution, which specifically comprises steps of: according to mass fraction, mixing 4-25% PVDF resin, 5-20% pore-forming agent and 0-3% inorganic particles in 52-91% solvent at 60-90° C. for obtaining a polymer separation layer casting solution with a total fraction of 100%; then stirring for 3-5 h for dissolving, and vacuum-defoaming, so as to obtain a homogenized PVDF polymer separation layer casting solution; wherein the pore-forming agent is a water-soluble polymer which is polyethylene glycol (PEG) having an average molecular weight of 600-20000, polyvinylpyrrolidone (PVP) having an average molecular weight of 10000-100000, or a blend thereof with a designed mass ratio; the solvent is selected from at least one of N,N-dimethylacetamide, N,N-dimethylformamide, dimethylsulfoxide and N-methylpyrrolidone; the inorganic particles are selected from at least one of lithium chloride, silicon dioxide and aluminum oxide.

According to the present invention, a working mechanism of the casting solution is to take advantage of the good thermodynamic compatibility and co-solvent property of the homogeneous material to prepare a homogeneous fiber reinforced PVDF hollow fiber membrane. Since the solvent in the casting solution swells and dissolves the fiber surface of the reinforcement, the interface bonding strength of the homogeneous fiber reinforced hollow fiber membrane is good. The homogeneous material can effectively avoid the compatibility problem of the interface between the polymer separation layer and the reinforcement caused by different materials, and the bonding between homogeneous material interfaces is tight for reducing the phase separation phenomenon, which not only improves anti-backwash performance of the hollow fiber membrane, but also extends the service life of the membrane in the aeration environment. Furthermore, convenient follow-up recycling of the homogeneous material is beneficial to recycling, so as to reduce the pollution of the environment.

Step (3): obtaining the homogeneous fiber reinforced PVDF hollow fiber membrane, which specifically comprises steps of: evenly coating the PVDF polymer separation layer casting solution on a surface of the hollow tubular reinforcement through a spinning nozzle; the hollow tubular reinforcement passes through a 2-25 cm air bath under traction of a winding roller; then immersing in a coagulation bath at 0-50° C. for solidifying, so as to obtain the homogeneous fiber reinforced PVDF hollow fiber membrane.

Preferably, a fineness of the PVDF fiber filaments is 300-800D; the PVDF fiber braided tube has 8-32 spindles with a knitting pitch of 0.3-2 mm; the PVDF fiber tubular knitted fabric is woven with No. 10-20 needles, and a needle cylinder comprises 12 needles.

Preferably, in the step (3), the hollow tubular reinforcement is pre-treated before obtaining the homogeneous fiber reinforced PVDF hollow fiber membrane. A pre-treatment refers to completely immersing the hollow tubular reinforcement in an organic solvent DMAc for 10 s, and slowly lifting up for drying in air for a while, in such a manner that excess solvent flows down until an incompletely dried state is reached for subsequent use. Beneficial effects of the pre-treatment are that the surface of the reinforcement is etched by the DMAc organic solvent to increase surface roughness of the reinforcement, in such a manner that a contact area between the reinforcement and the polymer separation layer is increased, thereby increasing interface bonding performance between the polymer separation layer and the reinforcement after solidifying.

Preferably, a spinning temperature of the PVDF polymer separation layer casting solution is kept at 60-80° C.; a traction speed of the winding roller is 30-200 m/h; the coagulation bath is an aqueous solution of an organic solvent; wherein the organic solvent is at least one of N,N-dimethylacetamide, N,N-dimethylformamide, dimethylsulfoxide and N-methylpyrrolidone, and a mass fraction of the organic solvent in the coagulation bath is 0-50%. At the beginning of the coating, the coagulation bath is pure water. At this time, the mass fraction of the solvent in the coagulation bath is 0%. However, as the coating process progressed, the polymer is continuously precipitated, and the mass fraction of the organic solvent in the coagulation bath keeps raising.

One skilled in the art will understand that the embodiment of the present invention as shown in the drawings and described above is exemplary only and not intended to be limiting.

Embodiment 1

A method for preparing a homogeneous fiber reinforced PVDF hollow fiber membrane comprises steps of:

(1) preparing a reinforcement, which specifically comprises steps of: using a 16-spindle high-speed braiding machine for weaving 600 dtex PVDF filaments into a PVDF fiber hollow braided tube with a knitting pitch of 1 mm, wherein a diameter is 1.2 mm, and a breaking strength is 245N;

(2) preparing a polymer separation layer casting solution, which specifically comprises steps of: mixing 17 wt % PVDF resin, 2 wt % lithium chloride and 8 wt % pore-forming agent PEG (molecular weight of 2000) in 73 wr % DMAc; then stirring under a water bath of 70° C. for 3 h for thoroughly mixing, and vacuum-defoaming, so as to obtain a PVDF casting solution;

(3) obtaining the homogeneous fiber reinforced PVDF hollow fiber membrane, which specifically comprises steps of: completely immersing the PVDF fiber hollow braided tube made by step (1) in the organic solvent DMAc for 10 s, and slowly lifting up for drying in air, in such a manner that excess solvent flows down until an incompletely dried state is reached for subsequent use; adopting a co-extrusion composite spinning process for co-extruding the PVDF fiber hollow braided tube and the PVDF separation layer casting solution through a spinning nozzle, which evenly coats the casting solution on a surface of the PVDF braided tube to form a primary membrane; passing the primary membrane through a 10 cm air bath under a traction speed of 2.5 m/min; then immersing in a room temperature coagulation bath (water) for solidifying, so as to obtain the homogeneous fiber reinforced PVDF hollow fiber membrane.

According to test result, the obtained hollow fiber membrane has a diameter of 1.4 mm, a breaking strength of 165.3 MPa, a room temperature pure water flux of 900 L/($m^2$·h) at 0.1 MPa, a membrane bubble pressure of 0.30 MPa at an ethanol bubble point, and a burst pressure>0.60 MPa (see FIGURE). Referring to FIGURE, the homogeneous fiber reinforced PVDF hollow fiber membrane comprises a hollow braided tube reinforcement and a separation layer, wherein the PVDF separation layer and the PVDF fiber reinforcement are tightly bound with sufficient bonding interface. There is no separation phenomenon, and membrane striping strength is enhanced, which can not only improve a service life of the membrane, but also be able to use in a demanding water treatment environment. In addition, an internal layer of braided tube has large pores which the separation layer has uniform finger-like pores, which to some extent increases a membrane flux.

Comparison 1

A method for preparing a polyester fiber reinforced PVDF hollow fiber membrane comprises steps of:

preparing a polyester hollow braided tube reinforcement with a method as recited in Embodiment 1 except for the braided tube is made of polyester filaments, a 24-spindle high-speed braiding machine is used for weaving and a knitting pitch is 0.9 mm, wherein other conditions are the same.

According to test result, the obtained polyester fiber reinforced PVDF hollow fiber membrane has a diameter of 2.0 mm, a breaking strength of 99.02 MPa, a room temperature pure water flux of 600 L/(m²·h) at 0.1 MPa, a membrane bubble pressure of 0.25 MPa at an ethanol bubble point, and a burst pressure of 0.3 MPa.

Comparison 2

A commercially available PVDF matrix homogeneous reinforced hollow fiber membrane was tested. According to test result, the hollow fiber membrane has a diameter of 1.1 mm, a breaking strength of 7.59 MPa, a room temperature pure water flux of 300 L/(m²·h) at 0.1 MPa, a membrane bubble pressure of 0.21 MPa at an ethanol bubble point, and a burst pressure of 0.45 MPa.

Embodiment 2

A method for preparing a homogeneous fiber reinforced PVDF hollow fiber membrane comprises steps of:

(1) preparing a reinforcement, which specifically comprises steps of: using a 24-spindle high-speed braiding machine for weaving 480 dtex PVDF filaments into a PVDF fiber hollow braided tube with a knitting pitch of 0.7 mm, wherein a diameter is 1.7 mm, and a breaking strength is 273.8N;

(2) preparing a polymer separation layer casting solution, which specifically comprises steps of: mixing 15 wt % PVDF resin, 2 wt % silicon dioxide and 10 wt % pore-forming agent PEG (molecular weight of 2000) in 73 wr % mixture of DMAc and dimethylsulfoxide; then stirring under a water bath of 70° C. for 3 h for thoroughly mixing, and vacuum-defoaming, so as to obtain a PVDF casting solution;

(3) obtaining the homogeneous fiber reinforced PVDF hollow fiber membrane, which specifically comprises steps of: completely immersing the PVDF fiber hollow braided tube made by step (1) in the organic solvent DMAc for 10 s, and slowly lifting up for drying in air, in such a manner that excess solvent flows down until an incompletely dried state is reached for subsequent use; adopting a co-extrusion composite spinning process for co-extruding the PVDF fiber hollow braided tube and the PVDF separation layer casting solution through a spinning nozzle, which evenly coats the casting solution on a surface of the PVDF braided tube to form a primary membrane; passing the primary membrane through a 13 cm air bath under a traction speed of 2.5 m/min; then immersing in a room temperature coagulation bath (water) for solidifying, so as to obtain the homogeneous fiber reinforced PVDF hollow fiber membrane.

According to test result, the obtained hollow fiber membrane has a diameter of 1.86 mm, a breaking strength of 116.93 MPa, a room temperature pure water flux of 950 L/(m²·h) at 0.1 MPa, a membrane bubble pressure of 0.29 MPa at an ethanol bubble point, and a burst pressure>0.55 MPa.

Embodiment 3

A method for preparing a homogeneous fiber reinforced PVDF hollow fiber membrane comprises steps of:

(1) preparing a reinforcement, which specifically comprises steps of: using a 16-spindle high-speed braiding machine for weaving 550 dtex PVDF filaments into a PVDF fiber hollow braided tube with a knitting pitch of 0.9 mm, wherein a diameter is 1.1 mm, and a breaking strength is 234.7N;

(2) preparing a polymer separation layer casting solution, which specifically comprises steps of: mixing 17 wt % PVDF resin, 3 wt % aluminum oxide and 15 wt % pore-forming agent polyvinylpyrrolidone K30 in 65 wr % DMF; then stirring under a water bath of 60° C. for 5 h for thoroughly mixing, and vacuum-defoaming, so as to obtain a PVDF casting solution, and (3) obtaining the homogeneous fiber reinforced PVDF hollow fiber membrane, which specifically comprises steps of: completely immersing the PVDF fiber hollow braided tube made by step (1) in the organic solvent DMAc for 10 s, and slowly lifting up for drying in air, in such a manner that excess solvent flows down until an incompletely dried state is reached for subsequent use; adopting a co-extrusion composite spinning process for co-extruding the PVDF fiber hollow braided tube and the PVDF separation layer casting solution through a spinning nozzle, which evenly coats the casting solution on a surface of the PVDF braided tube to form a primary membrane; passing the primary membrane through a 15 cm air bath under a traction speed of 3 m/min; then immersing in a room temperature coagulation bath (water) for solidifying, so as to obtain the homogeneous fiber reinforced PVDF hollow fiber membrane.

According to test result, the obtained hollow fiber membrane has a diameter of 1.33 mm, a breaking strength of 160.9 MPa, a room temperature pure water flux of 957 L/(m²·h) at 0.1 MPa, a membrane bubble pressure of 0.33 MPa at an ethanol bubble point, and a burst pressure>0.62 MPa.

Embodiment 4

A method for preparing a homogeneous fiber reinforced PVDF hollow fiber membrane comprises steps of:

(1) preparing a reinforcement, which specifically comprises steps of: using a crochet machine with a 12-needle cylinder having a diameter of 2.0 mm, and choosing a No. 14 needle for weaving 600 dtex PVDF filaments into a PVDF fiber hollow tubular knitted fabric with a diameter of 1.87 mm and a breaking strength of 174N;

(2) preparing a polymer separation layer casting solution, which specifically comprises steps of: mixing 17 wt % PVDF resin, 2 wt % lithium chloride and 11 wt % pore-forming agent PEG (molecular weight of 2000) with PVP (molecular weight of 58000) in 72 wt % NMP; then stirring under a water bath of 70° C. for 4 h for thoroughly mixing, and vacuum-defoaming, so as to obtain a PVDF casting solution; and (3) obtaining the homogeneous fiber reinforced PVDF hollow fiber membrane, which specifically comprises steps of: completely immersing the PVDF fiber hollow tubular knitted fabric made by step (1) in the organic solvent DMAc for 10 s, and slowly lifting up for drying in air, in such a manner that excess solvent flows down until an incompletely dried state is reached for subsequent use; adopting a co-extrusion composite spinning process for co-extruding the PVDF fiber hollow tubular knitted fabric and the PVDF separation layer casting solution through a spinning nozzle, which evenly coats the casting solution on a surface of the PVDF fiber tubular knitted fabric to form a primary membrane; passing the primary membrane through a 15 cm air bath under a traction speed of 3 m/min; then immersing in a room temperature coagulation bath (water) for solidifying, so as to obtain the homogeneous fiber reinforced PVDF hollow fiber membrane.

According to test result, the obtained hollow fiber membrane has a diameter of 1.97 mm, a breaking strength of 104.2 MPa, a room temperature pure water flux of 973 L/(m²·h) at 0.1 MPa, a membrane bubble pressure of 0.27 MPa at an ethanol bubble point, and a burst pressure>0.53 MPa.

Embodiment 5

A method for preparing a homogeneous fiber reinforced PVDF hollow fiber membrane comprises steps of:
(1) preparing a reinforcement, which specifically comprises steps of: using a crochet machine with a 12-needle cylinder having a diameter of 1.5 mm, and choosing a No. 16 needle for weaving 450 dtex PVDF filaments into a PVDF fiber hollow tubular knitted fabric with a diameter of 1.2 mm and a breaking strength of 125.7N;
(2) preparing a polymer separation layer casting solution, which specifically comprises steps of: mixing 18 wt % PVDF resin, 2 wt % silicon dioxide and 9 wt % pore-forming agent polyvinylpyrrolidone K30 in 71 wr % DMF; then stirring under a water bath of 60° C. for 4 h for thoroughly mixing, and vacuum-defoaming, so as to obtain a PVDF casting solution; and
(3) obtaining the homogeneous fiber reinforced PVDF hollow fiber membrane, which specifically comprises steps of: adopting a co-extrusion composite spinning process for co-extruding the PVDF fiber hollow tubular knitted fabric and the PVDF separation layer casting solution through a spinning nozzle, which evenly coats the casting solution on a surface of the PVDF fiber tubular knitted fabric to form a primary membrane; passing the primary membrane through a 15 cm air bath under a traction speed of 3 m/min; then immersing in a room temperature coagulation bath (water) for solidifying, so as to obtain the homogeneous fiber reinforced PVDF hollow fiber membrane.

According to test result, the obtained hollow fiber membrane has a diameter of 1.38 mm, a breaking strength of 99.6 MPa, a room temperature pure water flux of 937 L/(m²·h) at 0.1 MPa, a membrane bubble pressure of 0.34 MPa at an ethanol bubble point, and a burst pressure>0.68 MPa.

Embodiment 6

A method for preparing a homogeneous fiber reinforced PVDF hollow fiber membrane comprises steps of:
(1) preparing a reinforcement, which specifically comprises steps of: using a 8-spindle high-speed braiding machine for weaving 600 dtex PVDF filaments into a PVDF fiber hollow braided tube with a diameter of 0.8 mm and a breaking strength of 135N;
(2) preparing a polymer separation layer casting solution, which specifically comprises steps of: mixing 17 wt % PVDF resin, 2 wt % aluminum oxide and 9 wt % pore-forming agent polyvinylpyrrolidone K15 in 72 wr % NMP; then stirring under a water bath of 70° C. for 3 h for thoroughly mixing, and vacuum-defoaming, so as to obtain a PVDF casting solution, and
(3) obtaining the homogeneous fiber reinforced PVDF hollow fiber membrane, which specifically comprises steps of: adopting a co-extrusion composite spinning process for co-extruding the PVDF fiber hollow braided tube and the PVDF separation layer casting solution through a spinning nozzle, which evenly coats the casting solution on a surface of the PVDF braided tube to form a primary membrane; passing the primary membrane through a 10 cm air bath under a traction speed of 3 m/min; then immersing in a room temperature coagulation bath (water) for solidifying, so as to obtain the homogeneous fiber reinforced PVDF hollow fiber membrane.

According to test result, the obtained hollow fiber membrane has a diameter of 1.00 mm, a breaking strength of 174.3 MPa, a room temperature pure water flux of 927 L/(m² h) at 0.1 MPa, a membrane bubble pressure of 0.31 MPa at an ethanol bubble point, and a burst pressure>0.57 MPa.

Embodiment 7

A method for preparing a homogeneous fiber reinforced PVDF hollow fiber membrane comprises steps of:
(1) preparing a reinforcement, which specifically comprises steps of: using a 16-spindle high-speed braiding machine for weaving 600 dtex PVDF filaments into a PVDF fiber hollow braided tube with a knitting pitch of 1 mm, wherein a diameter is 1.2 mm, and a breaking strength is 245N;
(2) preparing a polymer separation layer casting solution, which specifically comprises steps of: mixing 17 wt % PVDF resin and 10 wt % pore-forming agent PEG (molecular weight of 2000) in 73 wr % DMAc; then stirring under a water bath of 70° C. for 3 h for thoroughly mixing, and vacuum-defoaming, so as to obtain a PVDF casting solution; and
(3) obtaining the homogeneous fiber reinforced PVDF hollow fiber membrane, which specifically comprises steps of: completely immersing the PVDF fiber hollow braided tube made by step (1) in the organic solvent DMAc for 10 s, and slowly lifting up for drying in air, in such a manner that excess solvent flows down until an incompletely dried state is reached for subsequent use; adopting a co-extrusion composite spinning process for co-extruding the PVDF fiber hollow braided tube and the PVDF separation layer casting solution through a spinning nozzle, which evenly coats the casting solution on a surface of the PVDF braided tube to form a primary membrane; passing the primary membrane through a 10 cm air bath under a traction speed of 2.5 m/min; then immersing in a room temperature coagulation bath (water) for solidifying, so as to obtain the homogeneous fiber reinforced PVDF hollow fiber membrane.

According to test result, the obtained hollow fiber membrane has a diameter of 1.4 mm, a breaking strength of 157.6 MPa, a room temperature pure water flux of 940 L/(m²·h) at 0.1 MPa, a membrane bubble pressure of 0.34 MPa at an ethanol bubble point, and a burst pressure>0.60 MPa.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:
1. A method for preparing a homogeneous fiber reinforced PVDF hollow fiber membrane, comprising steps of:
(1) preparing a hollow tubular reinforcement made of PVDF fibers; wherein the hollow tubular reinforcement is a PVDF fiber braided tube or a PVDF fiber tubular knitted fabric; the PVDF fiber braided tube is a hollow braided tube with a diameter of 1-2 mm, which is made of PVDF fiber filaments with a 2-dimensional woven technology; and the PVDF fiber tubular knitted fabric is a single layer tubular knitted fabric with a diameter of 1-2 mm, which is made of the PVDF fiber filaments with a crochet machine;

(2) preparing a PVDF polymer separation layer casting solution, which specifically comprises steps of: according to mass fraction, mixing 4-25% PVDF resin, 5-20% pore-forming agent and 0-3% inorganic particles in 52-91% solvent at 60-90° C. for obtaining a polymer separation layer casting solution with a total fraction of 100%; then stirring for 3-5h for dissolving, and vacuum-defoaming, so as to obtain a homogenized PVDF polymer separation layer casting solution; wherein the pore-forming agent is a water-soluble polymer which is polyethylene glycol having an average molecular weight of 600-20000, polyvinylpyrrolidone having an average molecular weight of 10000-100000, or a blend thereof with a designed mass ratio; the solvent is selected from at least one of N,N-dimethylacetamide, N,N-dimethylformamide, dimethylsulfoxide and N-methylpyrrolidone; the inorganic particles are selected from at least one of lithium chloride, silicon dioxide and aluminum oxide; and (3) obtaining the homogeneous fiber reinforced PVDF hollow fiber membrane with a breaking strength more than 90 MPa, which specifically comprises steps of: evenly coating the PVDF polymer separation layer casting solution on a surface of the hollow tubular reinforcement through a spinning nozzle; wherein a spinning temperature of the PVDF polymer separation layer casting solution is kept at 60-80° C.; the hollow tubular reinforcement passes through a 2-25 cm air bath under traction of a winding roller, and a traction speed of the winding roller is 30-200m/h; then immersing in a coagulation bath at 0-50° C. for solidifying, so as to obtain the homogeneous fiber reinforced PVDF hollow fiber membrane; the coagulation bath is an aqueous solution of an organic solvent; wherein the organic solvent is at least one of N,N-dimethylacetamide, N,N-dimethylformamide, dimethylsulfoxide and N-methylpyrrolidone, and a mass fraction of the organic solvent in the coagulation bath is 0-50%.

2. The method, as recited in claim 1, wherein a fineness of the PVDF fiber filaments is 300-800D; the PVDF fiber braided tube has 8-32 spindles with a knitting pitch of 0.3-2 mm; the PVDF fiber tubular knitted fabric is woven with No. 10-20 needles, and a needle cylinder comprises 12 needles.

3. The method, as recited in claim 1, wherein in the step (3), the hollow tubular reinforcement is pre-treated before obtaining the homogeneous fiber reinforced PVDF hollow fiber membrane, which comprises steps of: completely immersing the hollow tubular reinforcement in an organic solvent DMAc for 10s, and slowly lifting up for drying in air, in such a manner that excess solvent flows down until an incompletely dried state is reached for subsequent use.

\* \* \* \* \*